United States Patent [19]
Garavelli

[11] 3,797,268
[45] Mar. 19, 1974

[54] MACHINE FOR MAKING ICE CREAM
[75] Inventor: Giancarlo Garavelli, Rome, Italy
[73] Assignee: Isernia Aktiengesellschaft, Gamprin, Liechtenstein
[22] Filed: Feb. 1, 1972
[21] Appl. No.: 222,615

Related U.S. Application Data
[63] Continuation-in-part of Ser. No. 49,450, June 24, 1970, Pat. No. 3,724,234.

[30] Foreign Application Priority Data
Mar. 6, 1971 Italy .................................. 48857/71

[52] U.S. Cl. .................. 62/258, 62/342, 62/306
[51] Int. Cl. ......................................... F25c 7/14
[58] Field of Search ......... 62/69, 70, 340, 258, 261, 62/392, 389, 306

[56] References Cited
UNITED STATES PATENTS
3,267,688    8/1966   Carpigiani ..................... 62/342 X
3,462,968    8/1969   Puta et al ....................... 62/348
  651,412    6/1900   Bieder ............................ 62/70
3,656,316    7/1970   Stock ............................. 62/70

FOREIGN PATENTS OR APPLICATIONS
492,181    12/1970   Switzerland ..................... 62/342

Primary Examiner—William E. Wayner
Attorney, Agent, or Firm—Kimmel, Crowell & Weaver

[57] ABSTRACT

A machine for making ice cream having an independent container containing ice cream mix located within a refrigerating chamber, a cylinder of gas under pressure, a feed line extending from the cylinder to the container, a mixer-freezer located outside of the refrigerating chamber, and an outlet tube extending between the container and the mixer-freezer.

9 Claims, 7 Drawing Figures 3,797,268

MACHINE FOR MAKING ICE CREAM

CROSS-REFERENCE TO RELATED APPLICATION

This is a continuation-in-part of application Ser. No. 49,450 filed June 24, 1970, now U.S. Pat. No. 3,724,234.

BACKGROUND OF THE INVENTION

The present invention concerns a machine for making ice cream.

There already exist ice cream making machines in which the conventional mixer-freezer-distributor is fed with a mix drawn from a sealed, separate and independent container.

In these machines, the gas that is used to cause an expansion of the mix is dispersed within the mix before the latter is introduced into the mixer-freezer-distributor, the independent container for the mix and the mixer-freezer-distributor are linked by an outlet tube, and the ice cream is caused to pass from the container to the mixer-freezer-distributor either by means of gas pressure or by means of a pump situated at the exit of the container.

Quite small machines of the said type are placed on the counters of bars and ice cream-stalls, in restaurant kitchens, laboratories, and so forth. For purposes such as these, the mixer-freezer-distributor and the electric motor which turns its mixing blades, as well as the electrical controls for the machine, form an ensemble which can easily be placed on a counter, while the independent container and the gas cylinders (in those cases where a cylinder of gas is used as the source of gas pressure to convey the ice cream to the mixer-freezer-distributor and as the gas that is dispersed within the ice cream mix) may be placed at a greater or lesser distance from the rest of the machine.

Such machines work well and the risk of pollution from pathogenic germs is minimal, seeing that the whole ice cream making operation takes place in a closed circuit, and that the gas used is either sterile or sterilized. The machine may easily be washed under pressure by replacing the standard container of mix with another container of liquid detergent.

However, pollution by anaerobic germs cannot wholly be prevented if the operator of the machine leaves the mix in the container or the outlet tube for a long time. This may occur when the machine is used irregularly or in a discontinuous fashion, that is to say when the contents of the independent container are not used all at once to make a quantity of ice cream that is then stored in a refrigerator for later use. This danger of pollution is due to the fact that the independent container is frequently left at room temperature in heated rooms. Bacteriological infection is particularly liable to occur when the ice cream is immobile for a time in the outlet tube. This situation is aggravated by the fact that the electric motor which is used to power the mixer-freezer-distributor is customarily placed next to the latter within a small housing. This means that high temperatures, rising to above 50°C, may be produced within the housing, and thereby within the outlet tube, as it passes through the chassis.

One way of solving this hygiene problem and of preventing excessive bacteriological growth is of course to wash the machine every time it has remained unused beyond a certain time limit.

SUMMARY OF THE INVENTION

In order to solve this problem in accordance with this invention, the independent containers are placed within a refrigerating compartment having a constant low, but not very low temperature of between −5°C and +10°C. This solution has proved extremely efficient in machines of large size and of monobloc construction as the outlet tube is also contained within the refrigerated area and has no occasion to come anywhere near the motor as it passes from the independent container to the mixer-freezer-distributor.

In the case of small machines (such as those to be placed on a shop counter) a problem exists due to the outlet tube leaving the refrigerating chamber and having to cover a greater or lesser distance to reach the mixer-freezer-distributor. According to the present invention, a solution has been found to this problem by placing the motor within the refrigerating chamber and by giving that part of the outlet tube which lies between the said chamber and the mixer-freezer a length which varies between 0 (no length at all) and the maximum length to allow the cooling of the ice cream in the outlet tube by thermal conduction alone from either end of the said tube, that is to say the refrigerating chamber (point of departure) and the mixer-freezer (point of arrival), means furthermore being provided for the cooling of the distributing device (where further pollution might otherwise take place).

DESCRIPTION OF THE PREFERRED EMBODIMENTS

Figure 1:
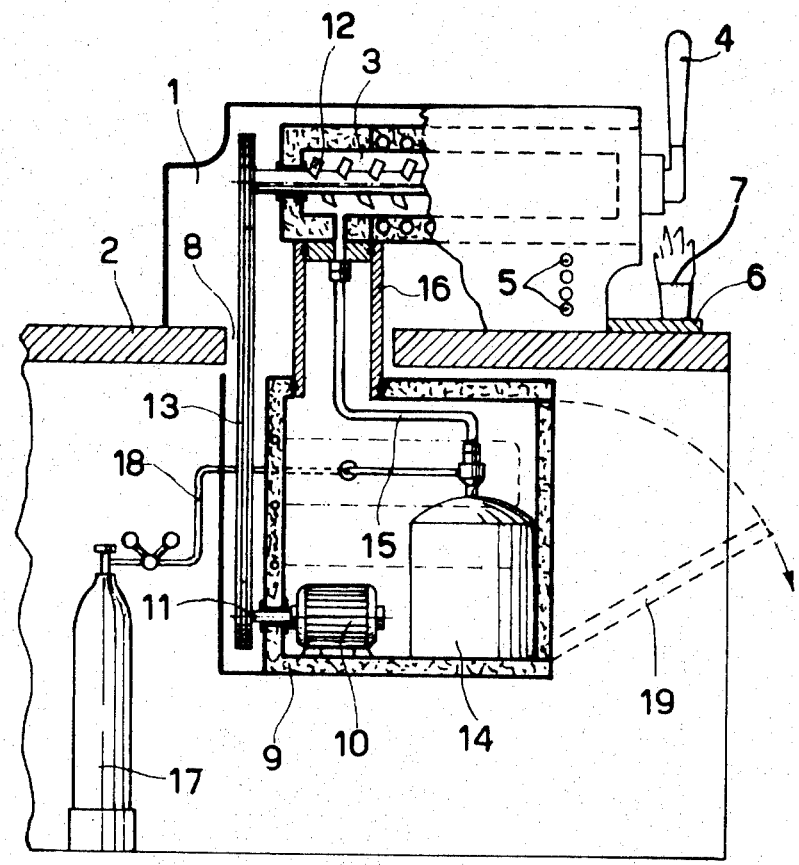
FIG. 1 represents a vertical cross-section of the machine of this invention.

As will be seen from FIG. 1, the machine comprises a housing 1 to be placed on a counter 2 and containing a mixer-freezer 3 and its distributing device 4 which projects from the housing 1. The housing 1 also contains a control device 5 as well as a drip board 6 on which tubs 7 are placed to be filled with ice cream.

Figure 2:
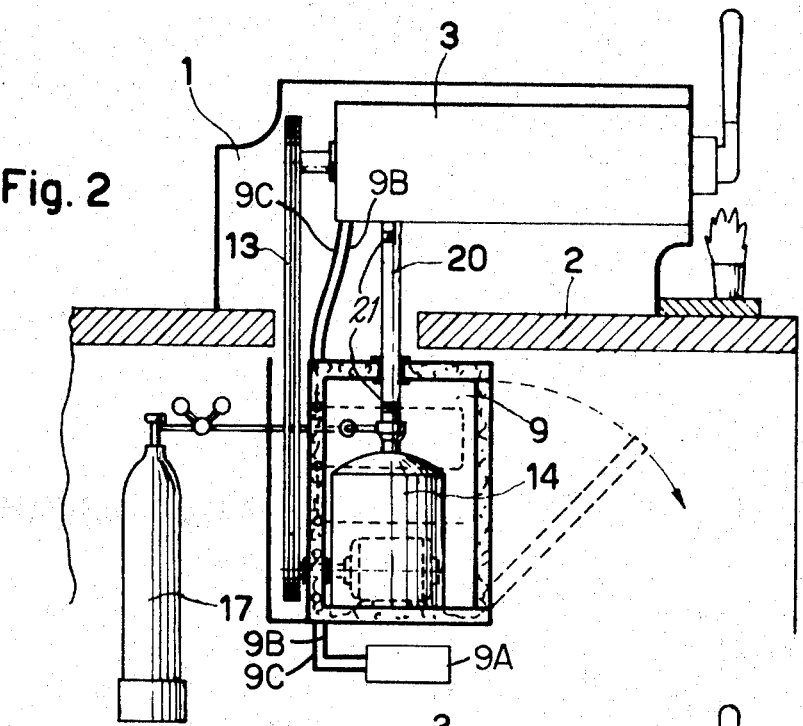
FIG. 2 represents a vertical cross-section of a variant of the machine.

The counter 2 has an opening 8 to communicate with those parts of the machine which are situated beneath the counter 2 itself, that is to say a refrigerating chamber 9 to which is connected a compressor 9A (FIG. 2) having supply line 9B and return line 9C which also cools the mixer-freezer 3.

Within the refrigerating chamber 9 is situated a motor 10 having a driving shaft 11 which serves to power blades 12 inside the mixer-freezer 3 via a belt drive 13. Independent containers 14 for the ice-cream mix are placed within the refrigerating chamber 9 through a door 19, and they are linked to the mixer-freezer by an outlet tube 15. Where this latter tube is outside the refrigerating chamber 9, it is surrounded by a wide insulated sleeve 16 which communicates with the said refrigerating chamber. As will be seen, both the independent containers 14 and the outlet tube 15 thus remain cooled and are maintained at a temperature of between −5°C and +10°C. The heat of motor 10 is quickly eliminated by the cooling effect of the compressor.

A cylinder of compressed gas 17 is linked to the container 14 by means of a feed line 18 which passes through an airtight hole in the side of the refrigerating chamber 9. This gas has the dual function already mentioned above of combining with the ice cream mix and of causing the product to be conveyed along the outlet tube 15.

The refrigerating chamber 9 may be built to withstand internal pressure, and the feed line 18 may open into this chamber as well as into the independent container 14. This arrangement makes it possible to use thin-walled containers 14 which may then be thrown away after use, as the internal pressure is counterbalanced by the ambient pressure within the refrigerating chamber 9.

Figure 3:
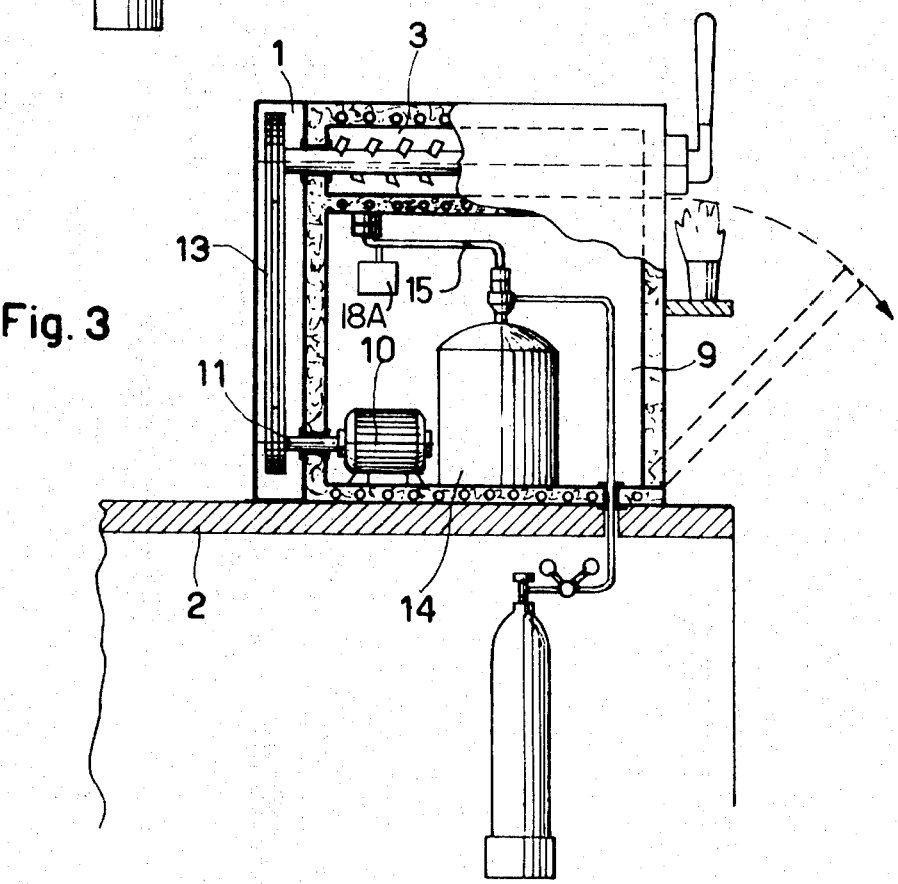
FIG. 3 represents a vertical cross-section of another variant of the machine.

It is of course possible to use a pump 18A (FIG. 3), linked to the top of the container 14, to force the ice cream along the outlet tube 15. In this case, the gas in the cylinder of gas under pressure serves only to form the gas-mix dispersion.

In another embodiment of the invention (see FIG. 2), a conduit 20, made preferably of stainless steel, may be used to link by means of connecting valves 21 the refrigerating chamber 9 to the mixer-freezer 3. The walls of conduit 20 and the ice cream within it are cooled by conduction from the refrigerating chamber 9 and from the mixer-freezer 3.

According to a variant form of the invention which is particularly destined for use in kitchens and laboratories (see FIG. 3), the refrigerating chamber 9 is placed within the housing 1 in direct contact with the mixer-freezer 3. Despite the overall size of this embodiment of the machine, it has the advantage of eliminating insulated sleeve 16, or of limiting, as a function of the ambient temperature, the length of outlet tube 15 between the refrigerating chamber 9 and the mixer-freeezer 3.

Figure 4:
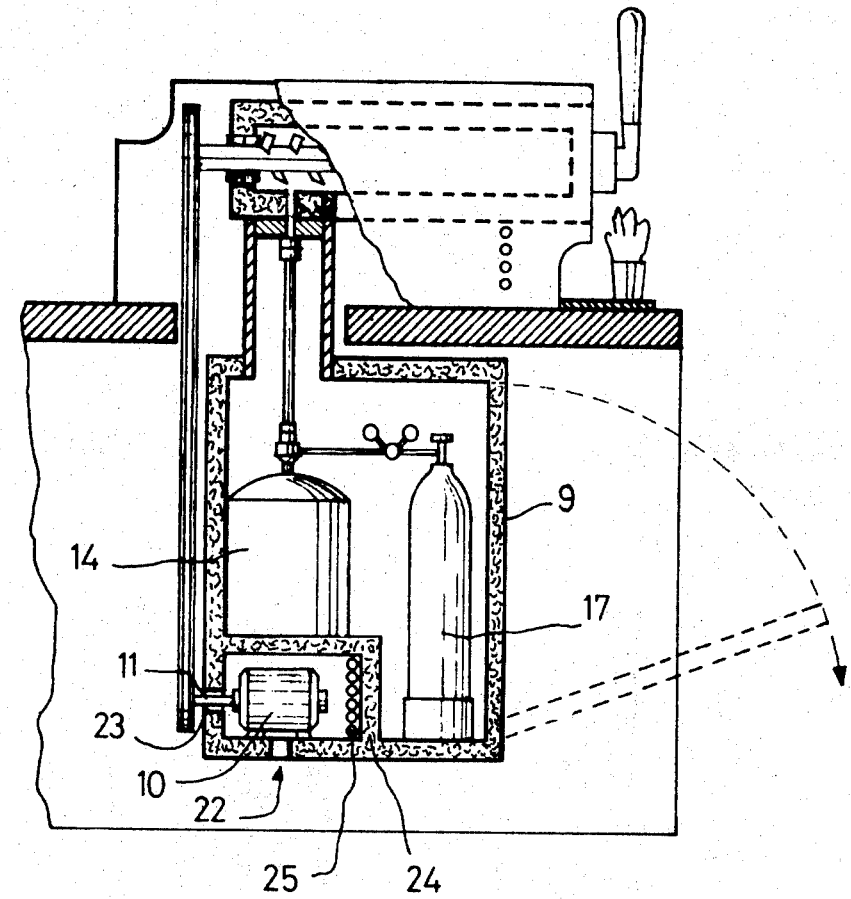
FIG. 4 represents a vertical cross-section of another variant of the machine.

It is assumed that the refrigerating chamber 9 may be made large enough to accommodate a cylinder of gas under pressure (see FIG. 4).

It is also possible to isolate the motor 10 in a separate compartment 24 situated within the refrigerating chamber 9 (see FIG. 4) and to have this compartment 24 cooled by a coil 25, the temperature being controlled by a thermostat, natural or artificial ventilation being provided through a hole 22 at the bottom of the compartment and another hole 23 at the side (through which it would be convenient to pass the driving shaft 11 of the motor 10).

Figure 5:
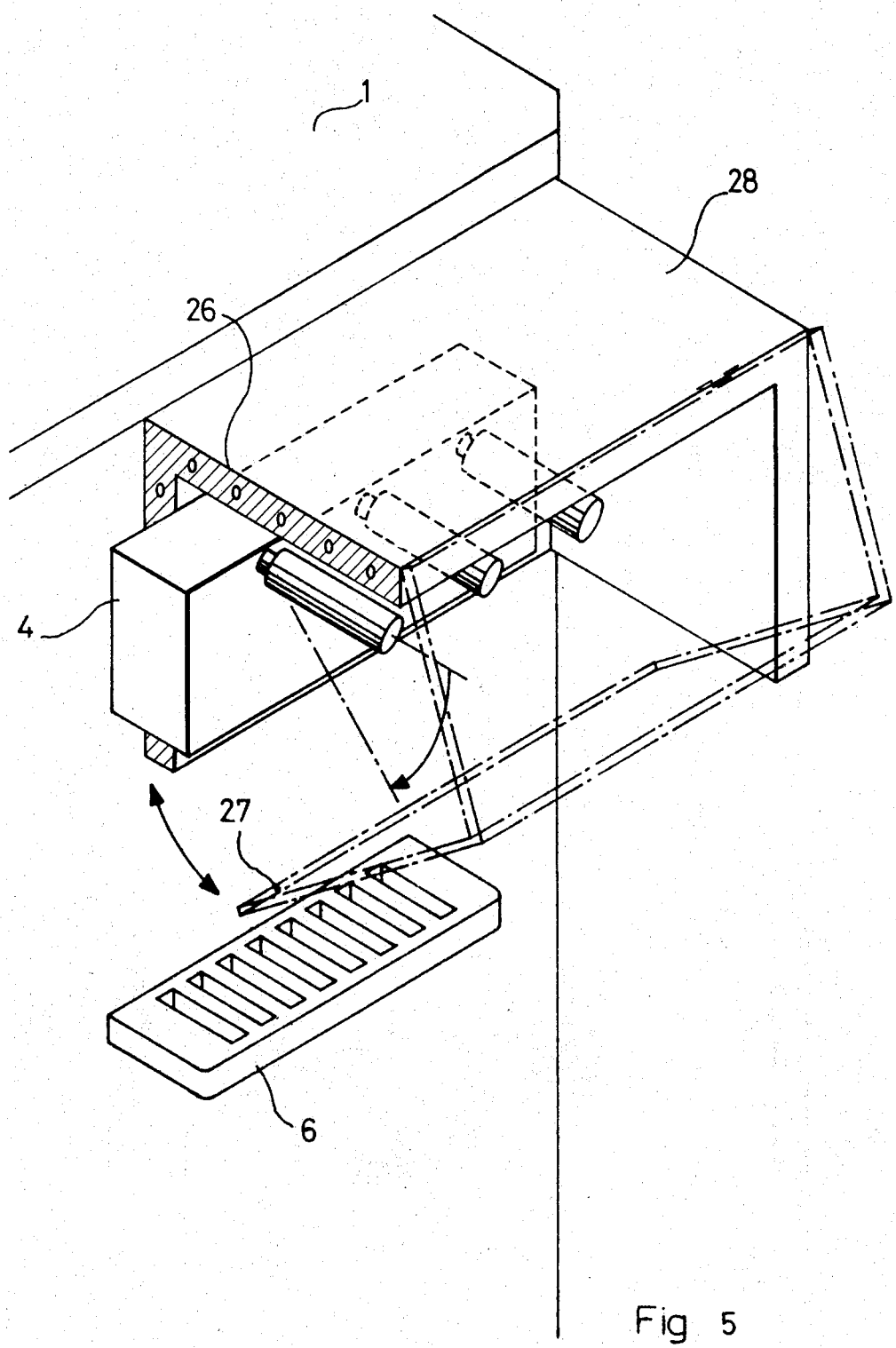
FIG. 5 represents a partially cut away view in perspective of the cooling system of the distributing device.

In the machines described above, all the parts in contact with the initial mix, with the dispersion of gas within the mix and with the ice cream that is produced are maintained at a temperature which prevents pollution, with the exception of the distributing device 4 which may cause pollution if the delivery of ice cream is not continuous. In order to eliminate this risk, the distributing device 4 is also contained within a refrigerating chamber 28 (see FIG. 5) fitted with a cooling coil 26 and a window 27 through which the ice cream may be served.

Figure 6:
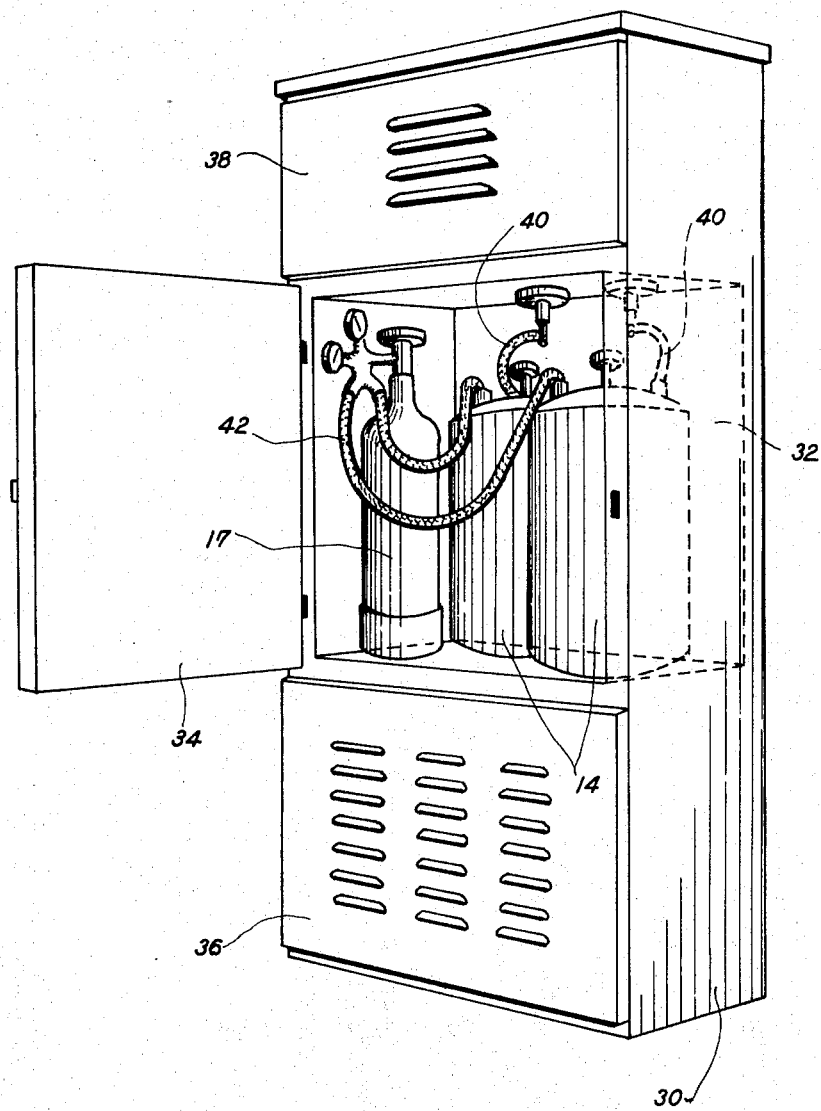
FIGS. 6 and 7 are perspective views of another variant of the machine.
Figure 7:
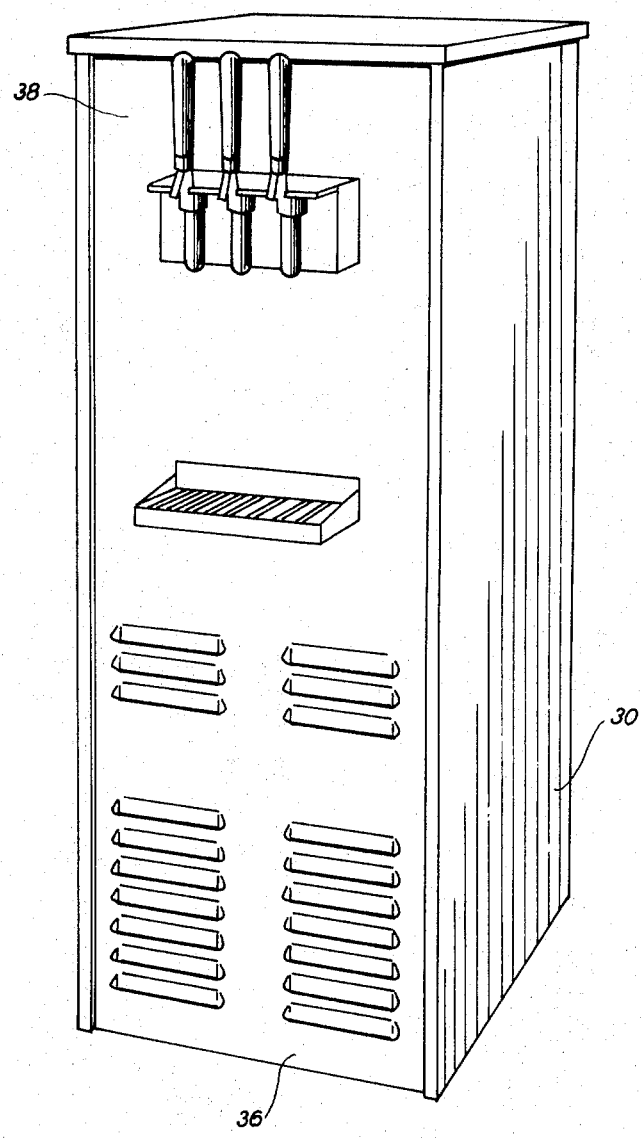

The embodiment of the machine shown in FIGS. 6 and 7 comprises an outer housing 30 inside which is situated a refrigerating compartment 32 which may be closed by a door 34. In the lower half 36 of this machine there is situated a compressor which operates to cool the refrigerating compartment 32 and/or the mixer-freezer 3, the latter being situated in the upper half 38 of this machine. In the refrigerating compartment 32 are placed containers 14 that are linked to the mixer-freezer by outlet tubes 40. The containers 14 are fed with compressed gas under pressure from the gas cylinder 17, that is located in the refrigerating compartment 32, by means of feed lines 42.

The machines according to the present invention have some remarkable and unexpected advantages:

They are easy to check over and take to pieces;

The mix, being always under refrigeration, absorbs a large proportion of the gas, and the gas-mix dispersion remains stable;

The electric motor works under optimal conditions;

Given the greater distance between the driving shaft and the shaft of the mixing device, the costly and delicate reducing drive is no longer necessary, which means that the machine works more quietly; and The whole construction is particularly economical.

I claim:

1. A machine for making ice cream comprising:
a refrigerating chamber; a mixer-freezer located outwardly of the refrigerating chamber; an independent container located within the refrigerating chamber adapted to contain ice cream mix; an outlet tube extending between said container and said mixer-freezer through which ice cream to be mixed and frozen is conveyed from the container to the mixer-freezer, at least part of said outlet tube being located in the refrigerating chamber and part of said outlet tube being outside of the refrigerating chamber, with the part of the outlet tube that is not located in the refrigerating chamber being of such length as to allow cooling of the ice cream mix therein solely by thermal conduction from the refrigerating chamber and the mixer-freezer; a source of gas under pressure; a motor, operatively connected to the mixer-freezer for powering the mixer-freezer, contained within the refrigerating chamber; a distributing device associated with the mixer-freezer; and means for cooling the distributing device, and a feed line extending from said source of gas to said container for conveying the gas to the container, said gas and the ice cream mix then being conveyed via the outlet tube from the container to the mixer-freezer.

2. A machine as defined in claim 1 further comprising: a counter situated above the refrigerating chamber; a housing placed on the counter which contains the mixer-freezer; a driving belt extending between the motor and the mixer-freezer; and an opening in the counter through which extend the driving belt and outlet tube.

3. A machine as defined in claim 1 further comprising: a compressor so constructed as to cool both the mixer-freezer and the refrigerating chamber.

4. A machine as defined in claim 1 further comprising: a door in the refrigerating chamber to permit the interchange of containers and the inspection of the refrigerating chamber.

5. A machine as defined in claim 1 further comprising: a wall forming part of the refrigerating chamber; and wherein said source of gas under pressure is located outwardly of the refrigerating chamber and said feed line extends through said wall; the gas having the dual function of combining with ice cream mix in the container and of conveying the gas-ice cream mix combination under pressure through the outlet tube.

6. A machine as defined in claim 1 further comprising: a pump interposed between the independent container and the outlet tube for conveying the gas-ice cream mix combination through the outlet tube.

7. A machine as defined in claim 1 in which said means for cooling the distributing device comprises: a second refrigerating chamber which contains the distributing device; and wherein said second refrigerating chamber comprises a window which serves as an opening through which the ice cream may be served.

8. A machine for making ice cream comprising: a refrigerating chamber; a mixer-freezer located outwardly of the refrigerating chamber; an independent container located within the refrigerating chamber adapted to contain ice cream mix; an outlet tube extending between said container and said mixer-freezer through which ice cream to be mixed and frozen is conveyed from the container to the mixer-freezer, at least part of said outlet tube being located in the refrigerating chamber; a source of gas under pressure; a feed line extending from said source of gas to said container for conveying the gas to the container, said gas and the ice cream mix then being conveyed via the outlet tube from the container to the mixer-freezer; and means so constructing the refrigerating chamber as to withstand a high internal pressure equivalent to the pressure inside the independent container.

9. A machine as defined in claim 1 wherein said outlet tube comprises a conduit that is attached at one end to the refrigerating chamber by a connecting valve and is attached at its other end to the mixer-freezer by a connecting valve.

* * * * *